S. D. HURLEY.
LAWN MOWER.
APPLICATION FILED APR. 30, 1913.
1,110,058.  Patented Sept. 8, 1914.
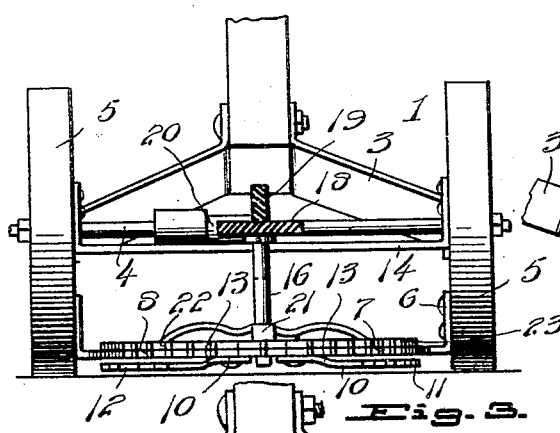
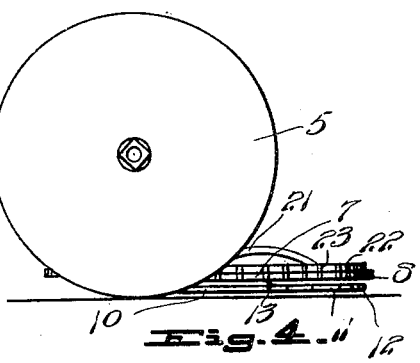
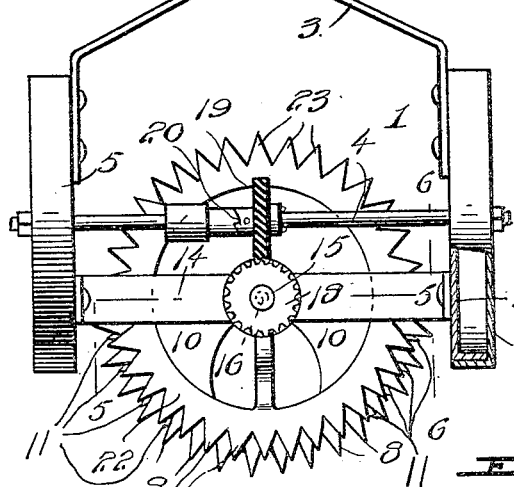
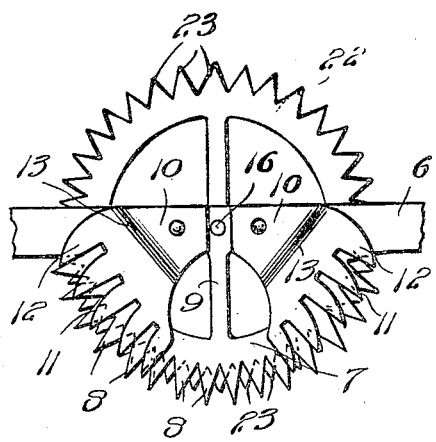
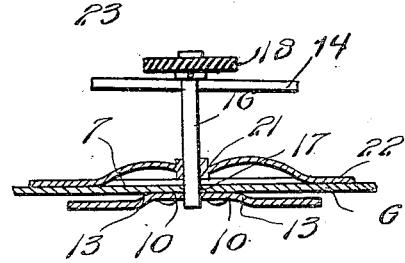
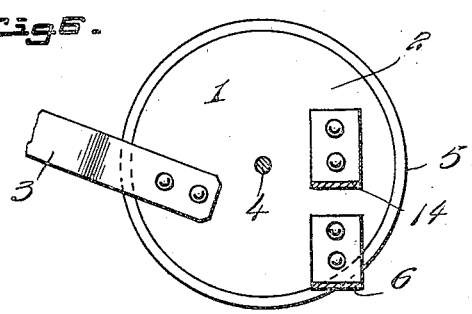
Witnesses
Inventor
S. D. Hurley.
By Chandler & Chandler
Attorneys

UNITED STATES PATENT OFFICE.

SAMUEL D. HURLEY, OF LAKE COMO, NEW JERSEY.

LAWN-MOWER.

1,110,058.

Specification of Letters Patent. Patented Sept. 8, 1914.

Application filed April 30, 1913. Serial No. 764,627.

*To all whom it may concern:*

Be it known that I, SAMUEL D. HURLEY, a citizen of United States, residing at Lake Como, in the county of Monmouth, State of New Jersey, have invented certain new and useful Improvements in Lawn-Mowers; and I do hereby declare the following to be a full, clear, and exact description of the invention, such as will enable others skilled in the art to which it appertains to make and use the same.

The present invention is directed to improvements in lawn mowers, and particularly to one employing a rotary cutting wheel which operates in conjunction with a fixed cutting member.

The invention has for its object to provide a lawn mower which consists of a very few parts, and one which can be manufactured at a small cost.

With these and other objects in view, this invention resides in the novel features of construction, formation, combination and arrangement of parts to be hereinafter more fully described, claimed and illustrated in the accompanying drawing, in which:—

Figure 1 is a front view of the mower. Fig. 2 is a side view. Fig. 3 is a top plan view. Fig. 4 is a fragmentary bottom plan view. Fig. 5 is a sectional view on line 5—5 of Fig. 3. Fig. 6 is a similar view on line 6—6 of Fig. 3.

Referring to the drawing, the numeral 1 designates a frame, which consists of circular side plates 2, and to which the handle yoke 3 is connected.

Journaled in the side plates 2 is the drive shaft 4, which is connected in the customary manner to the wheels 5.

Having its opposite ends secured to the circular plates 2 is a bar 6, which has formed integral therewith an arcuate bar 7, the forward edge of which is provided with a series of cutting teeth 8, said bar being connected to the bar 6 by a brace bar 9.

Secured to the under surface of the bar 6 are plates 10, said plates being substantially triangular in shape and have their edges 11 formed with a plurality of forwardly projecting curved fingers 12, which are arranged immediately under the teeth 8, and are spaced therefrom by bending said plates, as at 13.

A bar 14 is provided, and has its opposite ends connected to the circular plates 2, said bar being arranged immediately above the bar 6 and is provided centrally with a bearing 15, in which is journaled the shaft 16, the lower end of said shaft being journaled in a recess 17 formed in the bar 6.

Carried loosely by the drive shaft 4 is a gear 19 which meshes with the gear 18. The gear 19 is adapted to turn freely upon the shaft when the mower is moved backwardly, but is compelled to rotate therewith to impart rotary movement to the shaft 16 when the machine is being run forwardly. This is accomplished through the medium of the ratchet mechanism 20, and which forms no part of the invention.

Fixed to the lower end of the shaft 16 is a hub 21 of the wheel 22, the periphery of which is provided with a plurality of cutting teeth 23. From this construction it will be seen that when the mower is moved forwardly that rotary movement will be imparted to the wheel 22, thus causing the same to rapidly rotate so as to cut the grass which is engaged between the coacting teeth 23 and 8. Further it will be noted that by providing the fingers 12 that the grass will be properly directed and held in proper relation to the cutting teeth 8 so as to be acted upon by the teeth 23 when the wheel 22 revolves.

What is claimed is:—

A lawn mower comprising a frame consisting of side plates, a drive shaft supported by the side plates, vertically spaced bars having their ends connected to the side plates, the lowermost bar having an arcuate bar carried thereby, a series of cutting teeth formed upon the front edge of said bar, a shaft journaled in the vertically spaced bars, a wheel fixed to the lower end of said shaft and having its periphery provided with cutting teeth adapted to coact with the first named teeth to cut the grass, means connecting said shaft to rotate said wheel, plates connected to the lowermost bar and having fingers formed upon certain of their edges, said fingers serving to hold the grass to be cut in proper relation with the teeth formed upon the arcuate bar to be severed by the cutting teeth of said wheel.

In testimony whereof, I affix my signature, in the presence of two witnesses.

SAMUEL D. HURLEY.

Witnesses:
ANNIE C. PEARCE,
OWEN C. PEARCE.